United States Patent Office 3,443,363
Patented May 13, 1969

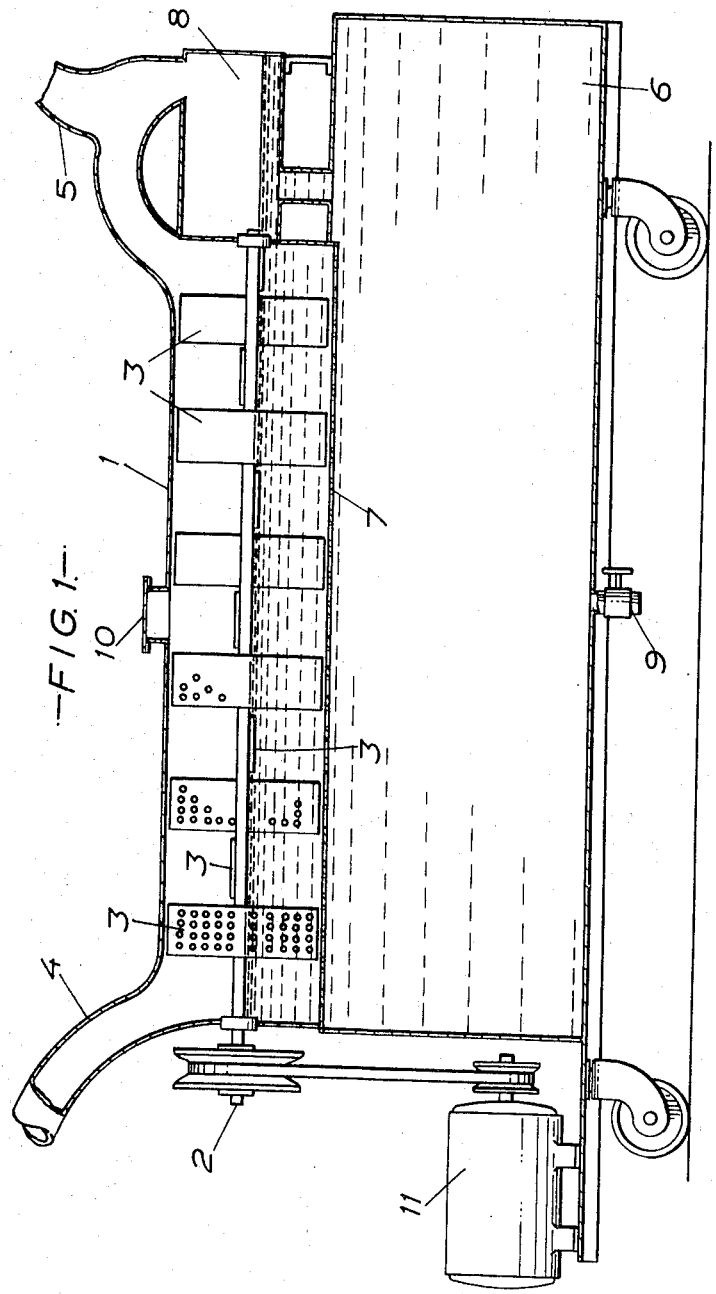

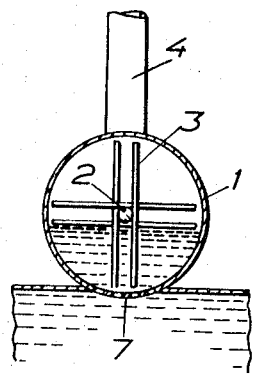
—FIG. 2.—
—FIG. 3.—
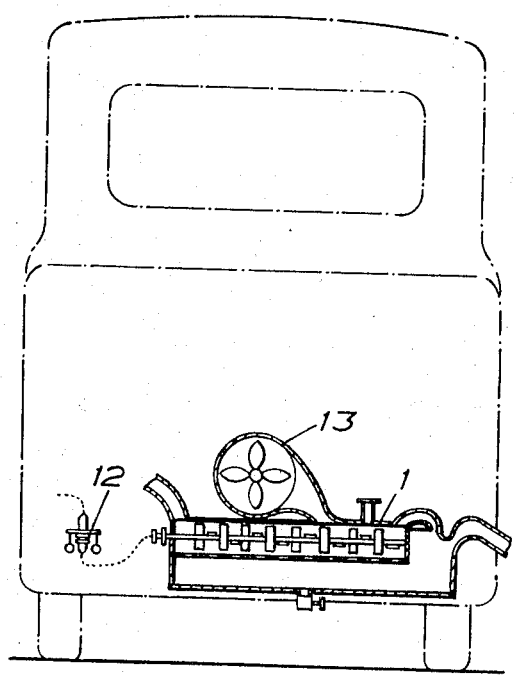

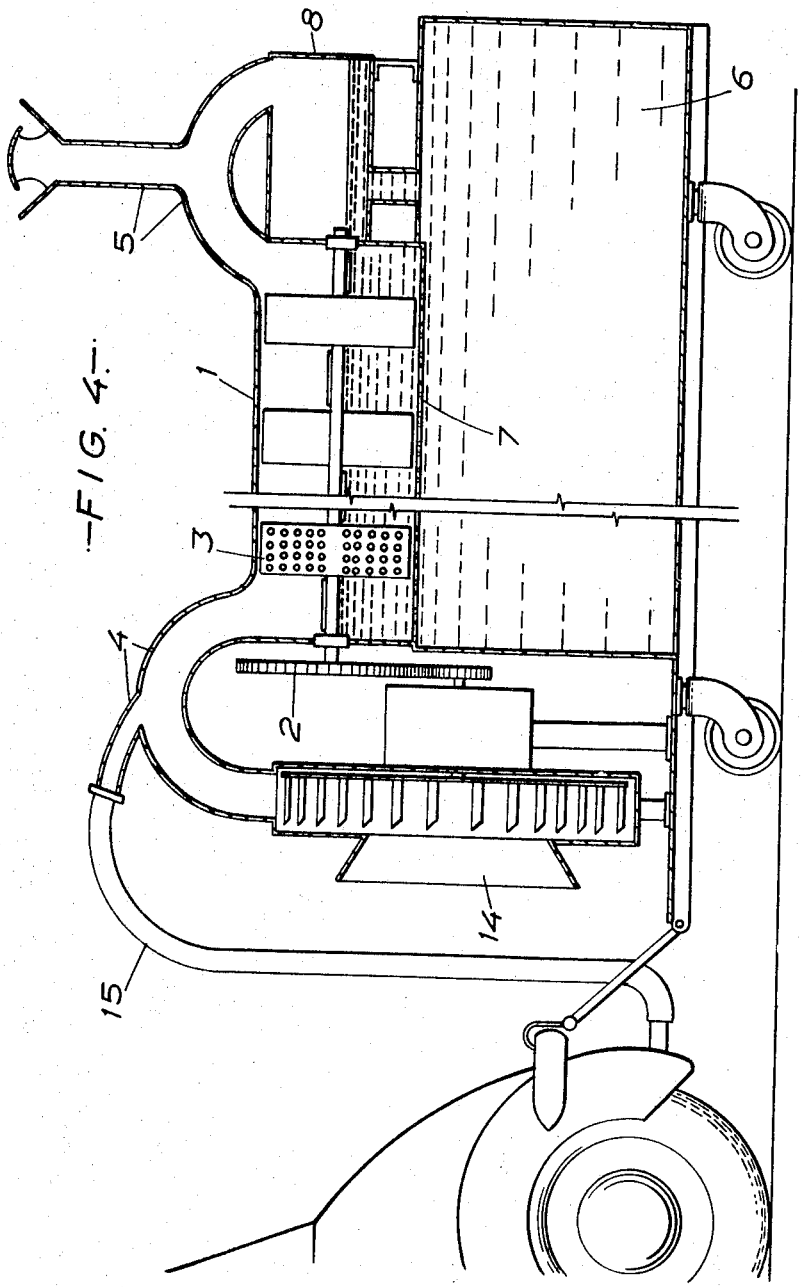

3,443,363
INSTALLATION FOR PURIFICATION OF GAS
Arthur Offergeld, 8 Rue des Foulons, Brussels, Belgium
Filed Sept. 22, 1966, Ser. No. 581,214
Int. Cl. B01d 47/02
U.S. Cl. 55—232                                1 Claim

ABSTRACT OF THE DISCLOSURE

Apparatus for purifying gas by passing the gas across a purification zone occupied by a dispersion or mist of droplets of purifying liquid, the free volume left between the droplets representing in the region of 50% of the volume of the purifying zone. The apparatus consists of a liquid reservoir and a purifying chamber, a rotatable shaft being mounted in the purifying chamber, said shaft being provided along its axis with a series of individual perforated alternately disposed blades.

---

The present invention concerns an installation for the purification of gas, so as to eliminate the insalubrious constituents.

The problem of air pollution especially forms the subject of many researches and has resulted, up to the present time, in several techniques of varying efficiency. It must however be noted that in general, each of these techniques refers to a particular case for purification, for example purifications of motor exhaust gases or purification of the atmosphere in factories or the purification of residual gases from synthetic chemical plants, each of these territories comprising numerous specific cases.

Moreover, the solutions proposed up to the present time are not entirely satisfactory, for several reasons. It is thus that several purification techniques proposed are not used, being too laborious. In many synthetic chemical works, the adaptation of such a system of purification of residual gas results in too heavy manufacturing costs of the final product desired.

In other cases, for example for the purification of motor exhaust gases, the known techniques are actually not only of a price which strongly limits their exploitation but also results in inconveniences, such as loss of power accruing in the exhaust circuit of the gases provoking disturbances in the normal running of the motor.

On the other hand, several of the purification techniques known up to the present time are of too little use so that they do not permit the suppression of preventative means of use, such as, for example the wearing of respiratory masks in arc welding factories, in spray painting, in mines etc. Furthermore, the atmosphere on the whole in industrial zones remains dangerously polluted, even with the use of varying devices for the purification of the residual gases and the fumes.

An object of the present invention is to remedy these inconveniences and an efficacious purification thanks to the use of simple and reasonably priced apparatus.

Another object of the invention us to provide a technique characterised by great simplicity or working and adapting itself easily to all gases to be purified.

The invention has likewise for its object the purification of gases, especially for eliminating all the noxious constituents whether they be solid, colloidal or gaseous.

Other objects or advantages of the present invention will appear from the following description.

The process for purification of gas, so as to eliminate the noxious constituents, consists in passing the gas across a purification zone occupied by a dispersion or mist of droplets of purifying liquid, the free volume left between the droplets representing in the region of 50% of the volume of the purifying zone.

More especially, this process is characterised by the fact that the gas is passed through an elongated purifying zone occupied by a dispersion of droplets of purifying liquid, this dispersion being obtained by mixing of the chosen purifying liquid which, at rest, occupies the lower half of this purification zone.

This mixing is effected by the rotation of alternately disposed vertical and horizontal blades, fixed on a rotatable shaft, situated at the level of the purifying liquid at rest, so that droplets of liquid are dispersed in the purifying zone.

This rotatable shaft is actuated, either by a motor, or by a transmission pulley. Numerous comparative tests have shown that the speed of rotation of this shaft should be in the region of 1000 revolutions per minute, so as to obtain an excellent dispersion and, consequently, maximum purification of the treated gas.

The installation used to this effect comprises, in its essential parts, a horizontal and cylindrical purification chamber provided with an inlet conduit for the gas to be purified and an outlet conduit for the purified gas, the transverse section of this chamber being greater than those of the conduits, this purification chamber comprising a horizontal rotatable shaft provided with alternately vertical and horizontal perforated blades, the purifying liquid forming an aerosol having, at rest, an upper level not higher than this horizontal shaft.

Preferably these vertical blades are alternately arranged to left and right of the rotatable shaft, whilst the horizontal blades are successively fixed above and below this shaft.

The blades being thus offset form, when the horizontal shaft rotates, an aerosol which is dense and homogenous with liquid droplets within the purification chamber. In fact, the blades being offset, any circulatory movement of the purifying liquid is avoided, as each blade breaks the circulatory movement which each adjacent blade would have a tendency to impart to the liquid and there is thus obtained, in the purification zone a veritable homogenous filter liquid.

It is to be noted that, so as to simplify the description, the term "gas" encompasses all gaseous mixtures, such as air, residual gases, fumes, from which it is desired to eliminate the insalubrious constituents.

The purifying liquid, forming the aerosol, chosen as a function of the nature of the or each insalubrious constituent to be eliminated. It is thus that in the case where this constituent is soluble in water, this alone would be used as the purifying liquid. To this water, there can be added a composition of alkaline characteristics when constituents to be eliminated are of an acid nature, as is the case, for example, of the carbon dioxide sulphurated hydrogen, etc. On the other hand, to increase the wetting possibilities of the water and thus facilitate the contact between the droplets of water and the constituents to be eliminated and, consequently, the fixing and removal to be these latter, it is useful, in certain cases, to add a tenseoactive composition to the water.

It is likewise to be observed that the addition of a small quantity of mineral oil to the water, of the order of several cubic centimeters per litre of water, gives an emulsion when the blades are rotated, which facilitates the formation of a dense and stable aerosol. Tests effected with such an emulsion have proved that it is possible to absorb $SO_2$, CO, vapors of chemical products, the gases emanating from arc welding, domestic gas etc. Moreover, it has provide that the addition of oil had the effect of protecting the metallic parts of the apparatus in contact with corrosive gases.

This aerosol, in which there always remains a free volume, in the region of 50%, between the liquid particles, permits the passage, without loss of charge, of the gas to be purified.

This observation is particularly important as the process of the present invention can thus be applied to all insalubrious gases, from whatever source, without disturbing the functioning of the apparatus from which the insalubrious gas emanates and ensures a very efficacious purification.

The invention will now be described further, by way of example, with reference to the accompanying drawings, in which:

FIG. 1 is a longitudinal vertical section of an installation constructed in accordance with the invention;

FIG. 2 is a vertical cross-section of the upper part of the installation showing the agitator blades;

FIG. 3 is an elevation, partly in section showing the device mounted in a motor bus; FIG. 3a is a partial section taken on line 3a—3a of FIG. 3;

FIG. 4 is a section through a movable apparatus suitable for purifying the atmosphere in work shops.

The device shown in FIG. 1 comprises an elongated and cylindrical purification chamber 1, provided with a rotatable shaft 2, coincident with the axis of this chamber 1. This shaft is provided with perforated blades 3, which, most advantageously, are alternately vertical and horizontal. FIG. 2, which shows, on the other hand the disposition of these blades, the vertical blades are alternately arranged to the left and the right of the shaft 2, whilst the horizontal blades are fixed successively above and below this shaft 2.

The purification chamber 1 also comprises (see FIG. 1) an inlet conduit 4 for the gas to be purified and an outer conduit 5 for the purified gas.

The purifying chamber 1 communicates with a chamber 6 by way of opening 7. This chamber 1 is completed by a separator 8 where any droplets possibly entrained by the force of the gasses, are separated therefrom and returned to the chamber 6, which thus reestablishes automatically, the level of the liquid in the purification chamber and maintains a liquid curtain, the density of which remains constant.

The installation also comprises two orifices 9 and 10, with closing devices, to permit respectively the removal of soiled purifying liquid and the filling of the chamber 6 with fresh liquid.

In this apparatus the gas to be purified enters through the conduit 4, penetrates into the purifying zone 1 where it crosses an aerosol of droplets of purifying liquid, this aerosol being produced by the rotation of blades 3 fixed to the shaft rotated by an appropriate device, for example a motor 11.

Thanks to the particular disposition of the blades, no gyratory movement of the liquid is produced and it forms a dense, homogeneous, aerosol, occupying all the space in the purification chamber.

In this way the gas is submitted to an efficacious purification in this zone and goes out, by the conduit 5 after having abandoned its dust and its insalubrious constituents, as well as the particles of liquid which are possibly entrained and which are retained in the separator 8.

It is evident that this apparatus can comprise numerous complementary devices. These can especially be added to this apparatus;

An aspirator or a turbine on the inlet conduit 4 for the gas to be treated, this aspirator or this turbine being able especially to rotate the shaft 2;

A reservoir for oil or other additive to mix with the purifying liquid;

Rollers to permit displacing the apparatus and to bring it to the source of the noxious wastes;

A monitor, automatically regulating the evacuation and the renewal of the purifying liquid, at regular intervals;

An automatic device for effecting the opening then the closing of the removal and feeding valves for purifying liquid, as a function of the input provided by an analyser continuously controlling the purity of the treated gas;

Control rollers for the temperature in the purifying chamber;

A device for capturing the filamentary dusts.

The process in accordance with the invention and device described above with its different variants, are particularly efficacious and consequently the installation necessary can be very small in size, the volume of the device being especially a function of the exhaust gas to be treated and of the concentration of the nature of the constituent to be eliminated.

Such an apparatus can, for example, be used for the purification of exhaust gasses from lorries, buses, automotive vehicle, etc.

In FIG. 3 there is shown the assembly of a purifying apparatus (such as is described in FIGS. 1 and 2) represented by the reference 1. This apparatus can be coupled to the motor, by any type of transmission. It follows however that the battery and the self-starter will have to surmount, not only the compression of the motor but also, the resistance provoked by the inertia of the purifying liquid contained in the apparatus 1. So as to avoid this inconvenience there is interposed a device 12 between the motor and the purifying apparatus. The functioning of this device is based on the centrifugal force, provoked by the distance apart of the two weights which, at the moment where the motor starts to turn, entrains a disc which automatically puts the bladed shaft of the purifying apparatus into motion. The conduit 4 is that of the burnt gas introduction emanating from the motor. There can also be provided a ventilator 13 conducting the air from inside the car to the purifier.

Another variant in the application process and in the installation of the present invention is represented in FIG. 4. This variant is particularly suitable for varying the insalubrious and noxious constitutents contained in the atmosphere in workshops (for example arc welding shops, garages, etc.), mines, tunnels and others. FIG. 4 illustrates more especially the application in the case of a garage.

The device previously described also comprises a turbine 14 adapted to suck air to be purified into the conduit 4. Moreover, this conduit 4 is also provided with a conduit 15 directly adapted to the exhaust pipe of an automotive vehicle to be repaired or to be tested.

This apparatus is easily displaced into any appropriate part of the workshop from which it is desired to remove odours or other insalubrious constituents.

By way of example of the efficaciousness of this process, there is given hereunder the results of several tests, which have no limitative characteristics.

*Example 1*

Cases containing carbon monoxide were submitted to purification so as to eliminate especially this latter constituent. The rotatable shaft entraining the blades turns in the region of 1000 revolutions per minute.

The efficaciousness of this purification was controlled in passing the purified gas into a tube containing a CO indicator "Monoxor." The indicator contains a colourless substance, passing gradually to yellow, then to brown and finally to black as a function of the quantity of the CO content of the gas.

First of all town gas which contained CO was submitted to purification in passing it into the device described above containing, as the purifying liquid, water to which mineral oil had been added (4 cm.$^3$ of oil per litre of water), at ambient temperature. After the passage of fairly large quantities of gas, a part of the indicator was slightly yellow.

In another test, there was passed into the gas purifier automotive vehicle exhaust fumes. The purified gas only lightly coloured the indicator substance contained in the tube.

On the contrary, an indicator tube took a dark tint when it was passed by cigarette smoke, not treated in the purifier but simply freed from tar and nicotine, and cooled.

These tests therefore show clearly that gasses containing CO are particularly freed of this constituent when they are treated by the process of the present invention.

By way of comparison, there has been effected tests on the exhaust from automotive vehicles containing 2.2% of $CO_2$ and 6.5% of CO.

In applying the process of the present invention:

(a) With water only as the purifying liquid, the rate of elimination of CO is 47.5%;

(b) With an ammoniacal aqueous solution of iron chloride and ammonium chloride (250 g. of $NH_4Cl$, 200 g. of CuCi and 250 cm.³ of ammonia in 750 cm.³ of water) the rate of elimination of CO is 67.8%. After a time, the apparatus used is strongly corroded;

(c) With water enriched with motor lubricating oil (4 cm.³ per litre of water), the rate of purification is 99%.

*Example 2*

Air into which there has been pulverised a mixture of phenolic and cresolic compositions (sold under the mark "Ardox" product of Union Chimique, S.A.) was passed into a purifying apparatus containing water enriched with oil. This air at the outlet of the apparatus, had no odour characteristic of these products.

*Example 3*

There was treated, as in the preceding example, air containing respectively 5%, 30% and 90% of $SO_2$. The purified air no longer contained $SO_2$ at the outlet of the purifying apparatus.

*Example 4*

There was treated as in the preceding examples air enriched with the emanations of arc welding. After passage through the purifying apparatus this air was freed of its emanations and no longer presented any toxicity.

Other improvements can be brought to the process and to the devices described above without departing from the scope of the present invention.

I claim.

1. An apparatus for purifying gas, consisting of a horizontal chamber, divided into a liquid reservoir in the lower section and an unobstructed purifying chamber in the upper section, an inlet conduit for gas to be purified arranged at one end of said purifying chamber and an outlet conduit for purified gas arranged at the opposite end of said purifying chamber, the transverse section of said purifying chamber being greater than that of said conduits, a rotatable horizontal shaft mounted in said purifying chamber, said shaft being provided along its axis with a series of individual perforated alternately disposed blades in which when a pair of blades are in a vertical direction they are alternately arranged to the left and to the right of the rotatable shaft, while a series of horizontal blades are fixed successively above and below the shaft.

References Cited

UNITED STATES PATENTS

| | | | |
|---|---|---|---|
| 206,736 | 8/1878 | Kirkham et al. | 261—92 |
| 727,088 | 5/1903 | Carlson | 261—92 |
| 1,144,193 | 6/1915 | Haas | 55—86 |
| 1,538,335 | 5/1925 | Koehler | 261—92 |
| 1,959,945 | 5/1934 | Bowman | 55—86 |
| 2,454,188 | 11/1948 | Legge | 261—92 X |

FOREIGN PATENTS

| | | |
|---|---|---|
| 60,168 | 1/1913 | Austria. |
| 21,243 | 10/1901 | Great Britain. |

REUBEN FRIEDMAN, *Primary Examiner.*

J. ADEE, *Assistant Examiner.*